(12) United States Patent
Mizuma et al.

(10) Patent No.: US 6,408,711 B1
(45) Date of Patent: Jun. 25, 2002

(54) BRAKE PEDAL APPARATUS OF VEHICLE

(75) Inventors: Hiroyuki Mizuma, Kanagawa-ken; Naoyuki Sugiyama, Tokyo; Masaharu Ishizuki, Kanagawa-ken; Jun Sato, Tochigi-ken, all of (JP)

(73) Assignees: Nissan Motor Co., Ltd., Kanagawa-Ken; F. Tech Incorporation, Tochigi-ken, both of (JP)

( * ) Notice: Subject to any disclaimer, the term of this patent is extended or adjusted under 35 U.S.C. 154(b) by 35 days.

(21) Appl. No.: 09/608,166

(22) Filed: Jun. 30, 2000

(30) Foreign Application Priority Data

Jul. 2, 1999 (JP) .......................... 11-189554
Dec. 28, 1999 (JP) .......................... 11-375844

(51) Int. Cl.⁷ ................................. G05G 1/14
(52) U.S. Cl. ........................... 74/512; 74/560
(58) Field of Search ................. 74/512, 513, 560; 180/274, 275

(56) References Cited

U.S. PATENT DOCUMENTS

| | | | |
|---|---|---|---|
| 5,086,663 A | * 2/1992 | Asano et al. | 74/512 |
| 5,615,749 A | * 4/1997 | Kato | 180/274 |
| 5,848,662 A | 12/1998 | Sakaue | |
| 5,996,439 A | * 12/1999 | Elton et al. | 74/512 |
| 6,158,299 A | * 12/2000 | Czajokowski | 74/513 |
| 6,176,340 B1 | * 1/2001 | Mizuma et al. | 180/274 |
| 6,186,025 B1 | * 2/2001 | Engelgau et al. | 74/512 |
| 6,279,417 B1 | * 8/2001 | Mizuma et al. | 74/512 |

FOREIGN PATENT DOCUMENTS

| | | |
|---|---|---|
| DE | 4409235 A1 | 10/1994 |
| DE | 19529347 A1 | 2/1997 |
| EP | 0827885 A1 | 3/1998 |
| EP | 0873923 A1 | 10/1998 |
| JP | 6-1113 | 1/1994 |
| JP | 10-175492 | 6/1998 |
| JP | 10-175568 | 6/1998 |
| JP | 10-236288 | 9/1998 |
| JP | 10-250624 | 9/1998 |
| JP | 11-5517 | 1/1999 |

* cited by examiner

*Primary Examiner*—David A. Bucci
*Assistant Examiner*—Vicky A. Johnson
(74) *Attorney, Agent, or Firm*—McDermott, Will & Emery

(57) ABSTRACT

A brake pedal apparatus of a vehicle is provided with a pedal bracket having a shaft and a first fixed portion to a first vehicle body member at its front portion, a pivot bracket rotatable pivoted to the shaft and provided with a pedal shaft apart from the shaft in a longitudinal direction of the vehicle, a pedal arm rotatably pivoted to the pedal shaft, and a lock plate having an engagement portion allowing relative movement with respect to at least the pivot bracket when a backward input over a predetermined load is applied to the pedal bracket and engaging with the pivot bracket in a normal state. In this structure, when the backward input over the predetermined load is applied to the pedal bracket, whereby the lock plate relatively moves, an engagement between the pivot bracket and the lock plate is disconnected, and the pivot bracket is downward rotated around the shaft

12 Claims, 7 Drawing Sheets

BRAKE PEDAL APPARATUS OF VEHICLE

BACKGROUND OF THE INVENTION

The present invention relates to a brake pedal apparatus of a vehicle.

Japanese Unexamined Utility Model Laid-Open Publication No. 6-1113 discloses a brake pedal apparatus of a vehicle.

In particular, there is disclosed a structure in which a pedal bracket rotatably supporting an upper end portion of a pedal arm is fastened and fixed to a dash lower panel and a lower surface portion of a dash upper panel connected to the dash lower panel and protruding to a passenger's room and a driver steps down the pedal arm, thereby forward pressing a push rod connected to the upper end portion of the pedal arm so as to actuate a Master vac.

SUMMARY OF THE INVENTION

However, in accordance with a consideration of the inventors of the present invention, in the structure mentioned above, when the Master vac or the dash lower panel fixing the Master vac is deformed so as to backward move to the passenger's room at a time of a front collision of the vehicle, a rotating force in a direction opposite to a pedaling direction is applied to the pedal arm via the push rod of the Master vac, and a pedaling position of the brake pedal is shifted backward, so that there can be expected a case that the driver generates a feeling of physical disorder.

An object of the present invention is to provide a brake pedal apparatus of a vehicle which can effectively prevent a collision load from being applied to a pedal arm via a push rod of a Master vac at a time of a front collision of a vehicle or the like and effectively prevent a driver from generating a feeling of physical disorder.

A brake pedal apparatus of a vehicle in accordance with the present invention is provided with a pedal bracket having a shaft and a first fixed portion to a first vehicle body member at its front portion, a pivot bracket rotatably pivoted to the shaft and provided with a pedal shaft apart from the shaft in a longitudinal direction of the vehicle, a pedal arm rotatably pivoted to the pedal shaft, and a lock plate having an engagement portion allowing relative movement with respect to at least the pivot bracket when a backward input over a predetermined load is applied to the pedal bracket and engaging with the pivot bracket in a normal state. In this structure, when the backward input over the predetermined load is applied to the pedal bracket, whereby the lock plate relatively moves, an engagement between the pivot bracket and the lock plate is disconnected, and the pivot bracket is downward rotated around the shaft.

DETAILED DESCRIPTION OP THE PREFERRED EMBODIMENTS

A description will be in detail given below of each of embodiments of a brake pedal apparatus of a vehicle in accordance with the present invention with reference to the accompanying drawings.

Figure 1:
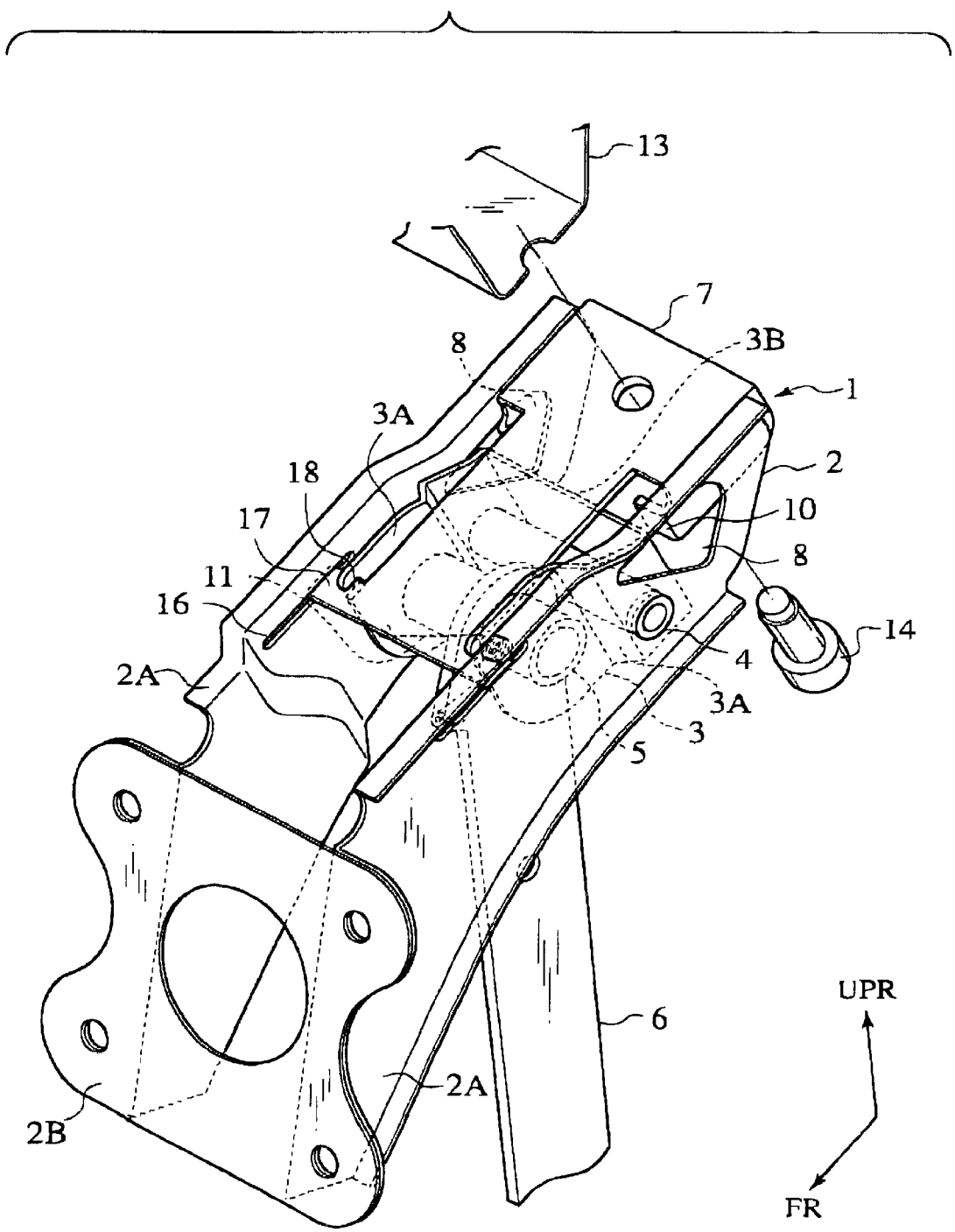
FIG. 1 is a perspective view of a first embodiment of a brake pedal apparatus of a vehicle in accordance with the present invention.
Figure 2:
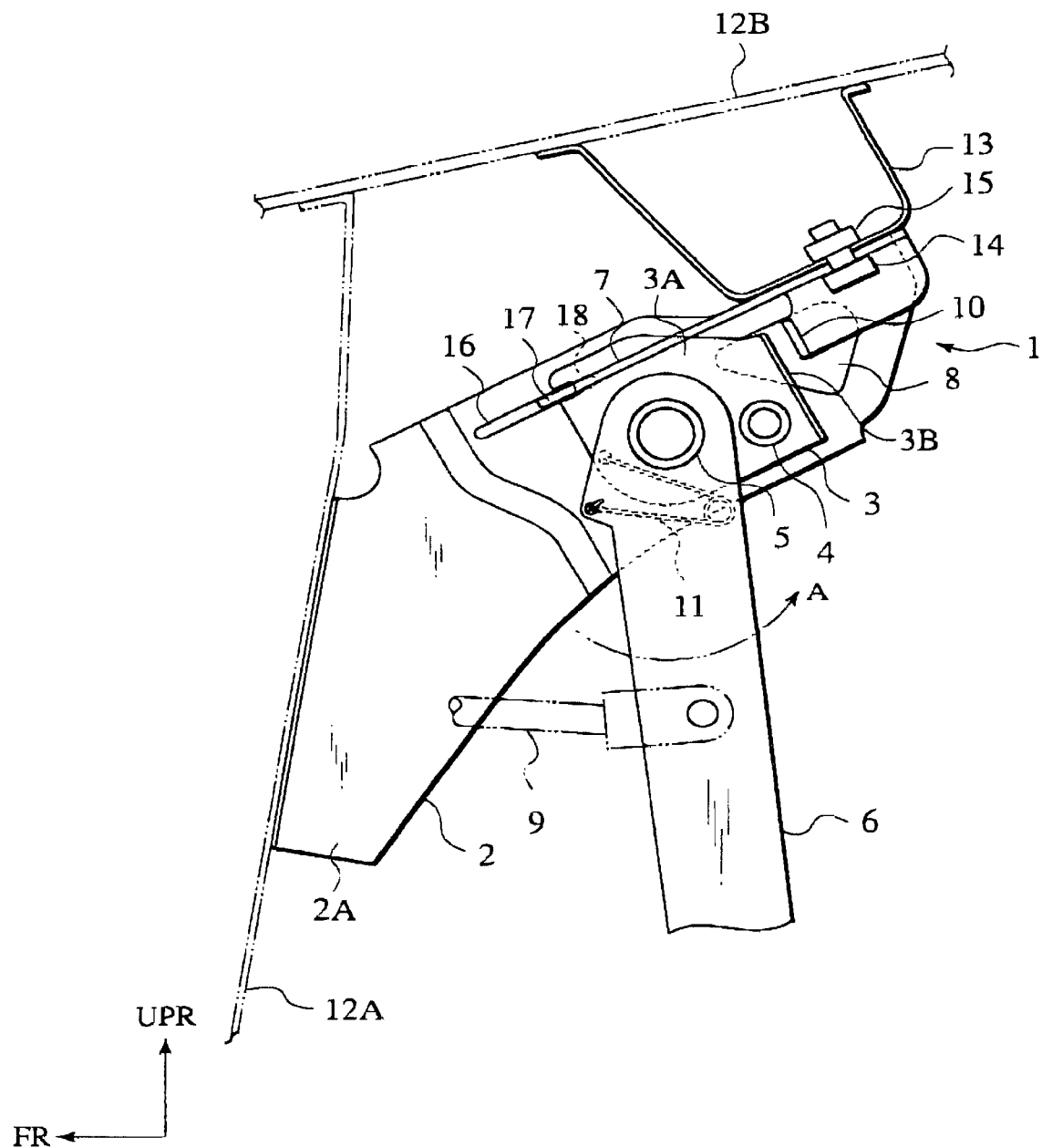
FIG. 2 is a side elevational view of the first embodiment in correspondence to a normal state.
Figure 3:
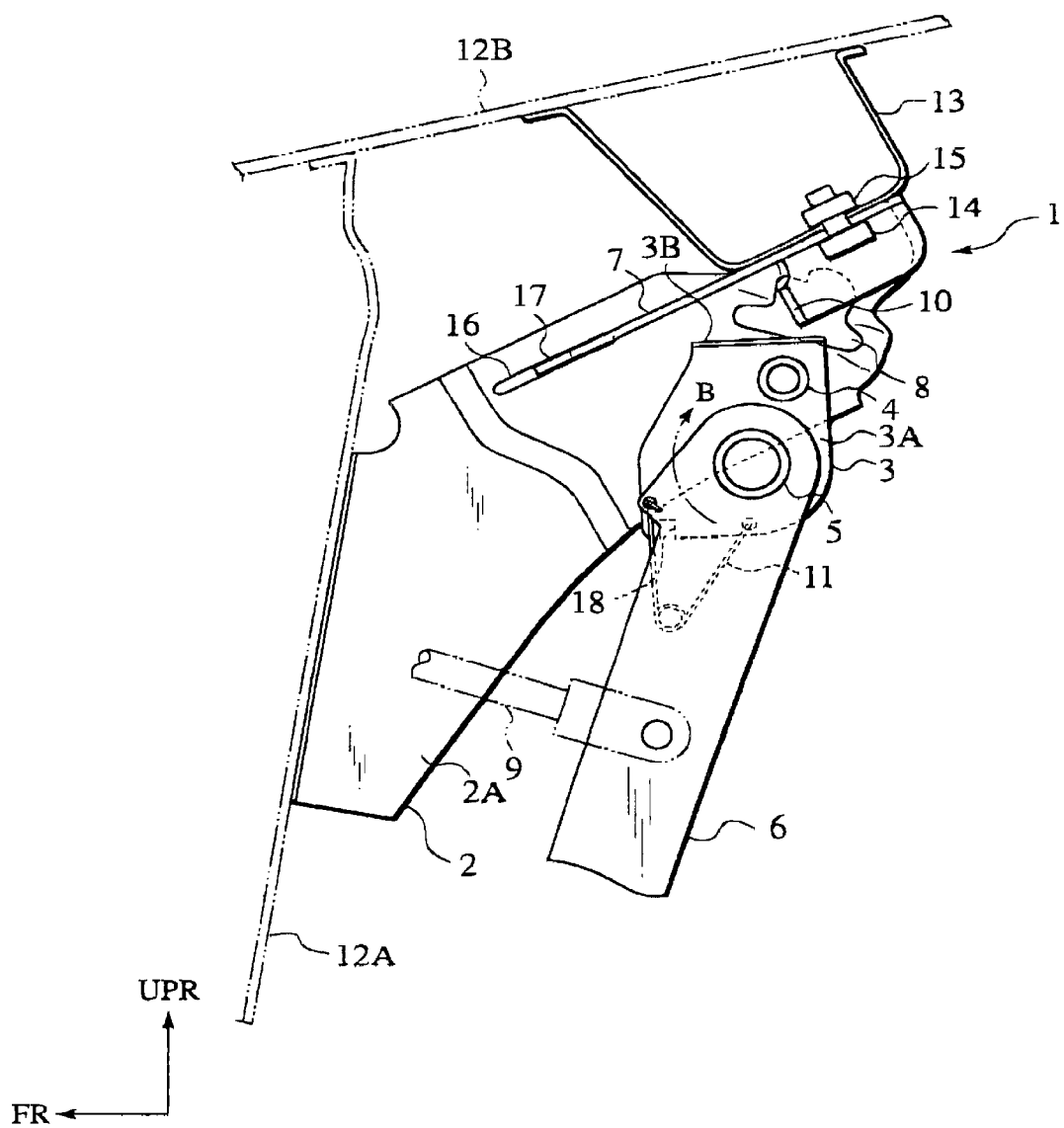
FIG. 3 is a side elevational view of the first embodiment in correspondence to a collision state.
Figure 4:
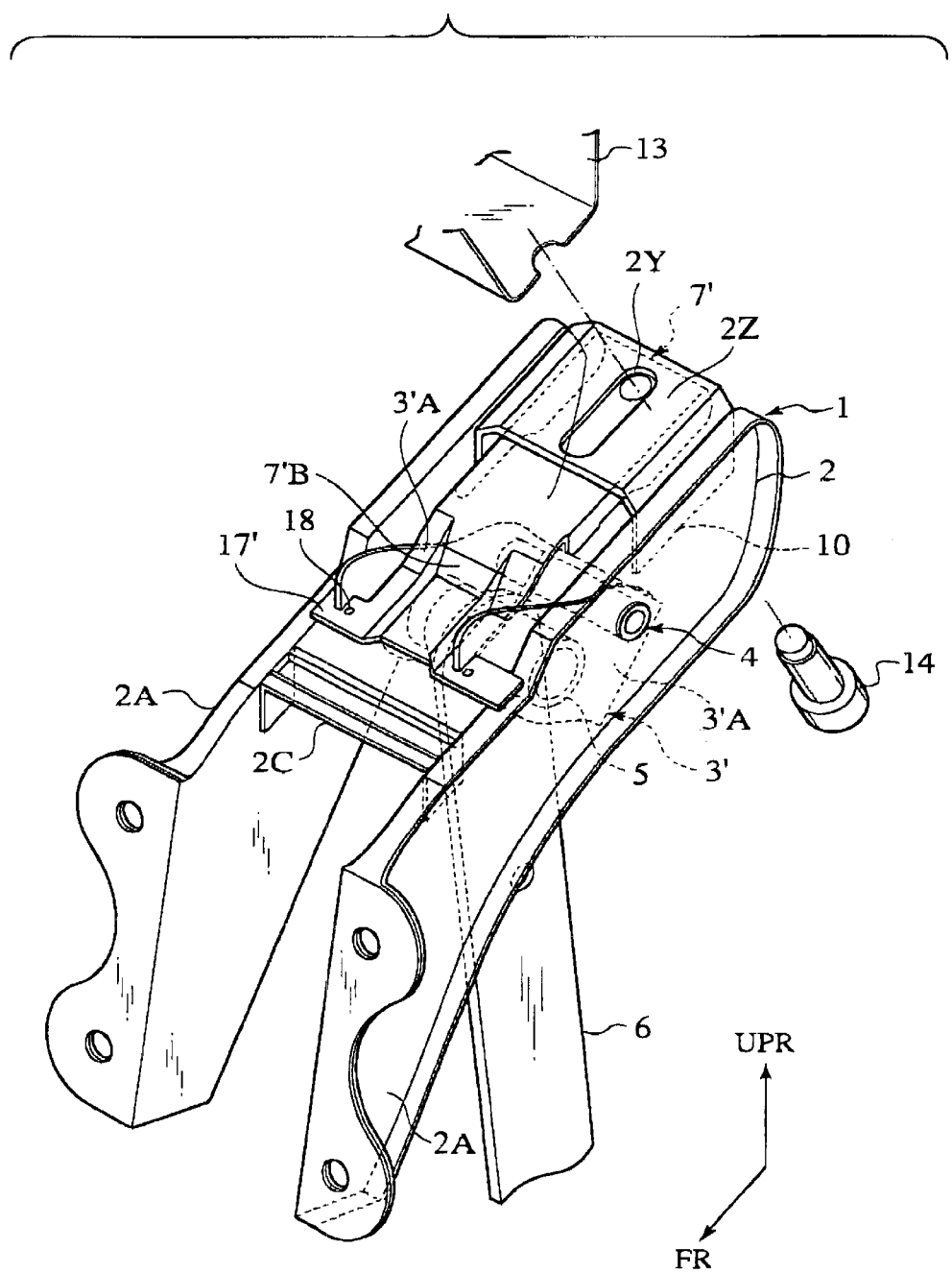
FIG. 4 is a perspective view of a second embodiment of a brake pedal apparatus of a vehicle in accordance with the present invention.
Figure 5:
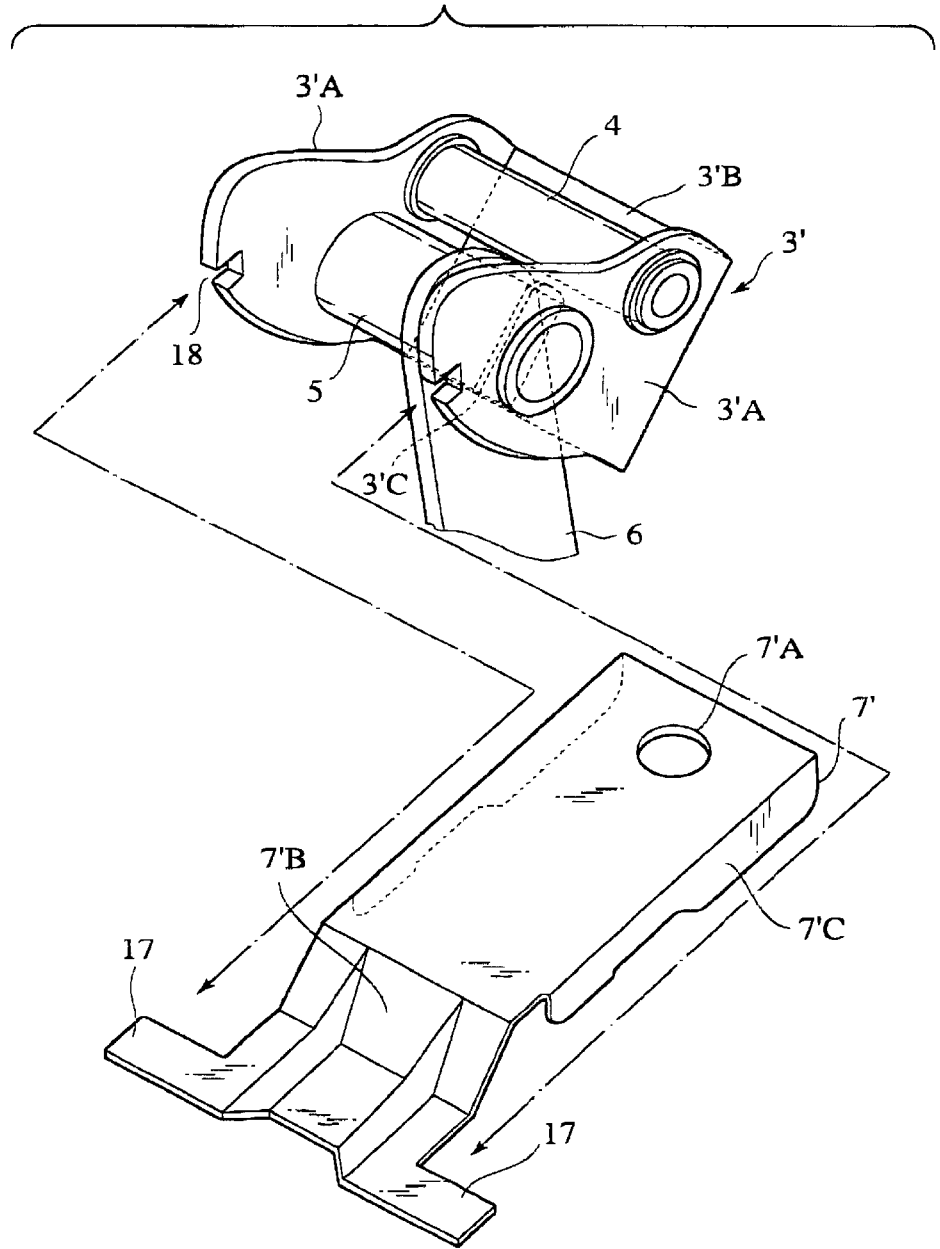
FIG. 5 is a perspective view showing a pivot bracket and its corresponding lock plate of the second embodiment.

At first, a description will be in detail given of a brake pedal apparatus of a vehicle in accordance with a first embodiment with reference to FIGS. 1 to 3. In this case, in the drawings, reference symbol FR indicates a forward portion of a vehicle and reference symbol UPR indicates an upward portion of the vehicle.

In a brake pedal apparatus 1 shown in FIGS. 1 to 3, reference numeral 2 denotes a pedal bracket fastened and fixed to a dash lower panel 12A of a dash panel 12 by bolts and nuts (not shown).

The pedal bracket 2 is basically constituted by plate members 2A and 2A arranged apart from each other as a pair of opposing side surface portions, and a mounting member 2B connecting them at a front portion of the vehicle.

Reference numeral 3 denotes a pivot bracket formed in a C shape as seen from the above and rotatably pivoted to a shaft 4 provided in the pedal bracket 2.

In the pivot bracket 3, a pedal arm 6 is rotatably pivoted to a pedal shaft 5 provided between opposing side plate portions 3A and 3A of the pivot bracket 3 in a vehicle forward portion with respect to the shaft 4.

Reference numeral 7 denotes a lock plate formed in a substantially flat plate shape.

The lock plate 7 is fixed to a lower surface portion of a dash upper panel 12B connected to an upper end of the dash lower panel 12A extending backward in the vehicle, and is fixed to a rear end portion of the plate members 2A and 2A of the pedal bracket 2.

A movement absorbing portion serving as a collision absorbing portion allowing a relative movement in a longitudinal direction of the vehicle (forward/rearward direction of the vehicle) between the shaft 4 and the lower surface portion of the dash upper panel 12B when the input in the rearward direction (the rearward of the vehicle) over the predetermined load is applied to the pedal bracket 2 at a time of collision of the vehicle or the like is provided in the pedal bracket 2 and between the fixed point of the lock plate 7 and the shaft 4.

In the present embodiment, the movement absorbing portion is constituted by a window portion 8 provided in a rear portion of the plate members 2A and 2A.

The lock plate 7 is in particular, fastened and fixed to a lower surface of a vehicle side bracket 13 connected and arranged on a lower surface of the dash upper panel 12B at a rear end portion thereof by a bolt 14 and a nut 15, and is fixed to the rear end portions of the opposing plate members 2A and 2A in the pedal bracket 2 by a spot welding or the like.

A front end portion of the lock plate 7 is engaged and fixed by inserting an engagement portion 17 projected from a side end portion of the lock plate 7 to a slit 16 provided on a side surface of the pedal bracket 2 so as to extend in a longitudinal direction of the vehicle, and the engagement portion 17 at a front end portion is engaged with a notch portion 18 provided in the front end portion of the side plate portion 3A in the pivot bracket 3.

Accordingly, in a normal state corresponding to a state that the vehicle is not collided, the engagement portion 17 in the front end portion of the lock plate 7 and the notch portion 18 in the front end portion of the pivot bracket 3 are engaged, thereby rotating the pedal arm 6 around the pedal shaft 5 corresponding to a supporting point in a state of securely restricting a rotation in a downward direction of the vehicle of the pivot bracket 3 and securely performing a general Master vac operation via a push rod 9 connected to the pedal arm 6.

On the contrary, at a time of a front collision of the vehicle, the pedal bracket 2 is crushed in a longitudinal direction of the vehicle in the window portion 8 corresponding to the movement absorbing portion. Due to a compression deformation generated by this crush, the lock plate 7 fixed to the dash upper panel 12B relatively moves with respect to the pivot bracket 3 in the forward diction of the vehicle while being guided by the slit 16.

Accordingly, an engagement between the pivot bracket 3 and the lock plate 7 is disconnected so as to allow the rotation of the pivot bracket 3, rotate the pivot bracket 3 in the backward and downward direction of the vehicle around the shaft 4 corresponding to a supporting point and draw a pedaling position of the pedal arm 6 near the forward side of the vehicle.

That is, since the pedal shaft 5 of the pedal arm 6 moves backward in the vehicle, the pedaling position of the pedal arm 6 moves to the forward portion of the vehicle.

Further, in accordance with the present embodiment, as a rotation promoting portion for promoting a rotational operation of the pivot bracket 3, a contact portion 10 is provided in the lock plate 7, That is, at a time of the front collision of the vehicle, the window portion 8 is crushed, the pedal bracket 2 is compressed and deformed between the fixed portion of the lock plate 7 and the shaft 4 so that a distance thereof is reduced, and the contact portion 10 is brought into contact with a rear end portion 3B of the pivot bracket 3 disposed above the vehicle in comparison with the shaft 4 at a time when the lock plate 7 relatively moves in a longitudinal direction with respect to the pivot bracket 3 so as to come near, thereby promoting the rotational operation of the pivot bracket 3.

Further, a spring 11 is provided between the pivot bracket 3 and the pedal arm 6, as an urging member for urging a pedaling position of the pedal arm 6 toward the forward portion of the vehicle at a time of the rotation of the pivot bracket 3.

An urging force of the spring 11 is applied in a direction of returning the pedal arm 6 (a direction of an arrow A) in the normal state shown in FIG. 2, however, when the rotation of the pivot bracket 3 is over a predetermined range, the urging force is turned over so as to be applied in a direction of an arrow B shown in FIG. 3, thereby urging the pedaling position of the pedal arm 6 toward the forward portion of the vehicle.

In accordance with the structure of the present embodiment mentioned above, since the rotation of the pivot bracket 3 is restricted by the lock plate 7 in the normal state, it is possible to rotate the pedal arm 6 around the pedal shaft 5 corresponding to a supporting point so as to securely perform an operation of the general Master vac via the push rod 9 connected to the pedal arm 6.

On the contrary, when the vehicle collides head-on or the like, the window portion 8 corresponding to the movement absorbing portion is crushed and the pedal bracket 2 is compressed and deformed between the fixed portion of the lock plate 7 and the shaft 4, whereby the engagement between the pivot bracket 3 and the lock plate 7 is disconnected so as to allow the rotation of the pivot bracket 3 and rotate the pivot bracket 3 to the downward rear portion of the vehicle around the shaft 4 corresponding to a supporting point, thereby drawing rho pedaling position of the pedal arm 6 near the forward portion of the vehicle.

Accordingly, even when the Master vac (not shown) backward moves or the dash lower panel 12A is deformed to the passenger's room and then the push rod 9 of the Master vac (not shown) backward moves, it is possible to effectively prevent the pedaling position of the pedal arm 6 from being shifted backward and the driver from generating a feeling of physical disorder.

In particular, in accordance with the present embodiment, since the movement absorbing portion is constituted by the window portion 8 formed in the pedal bracket 2, the construction can be made simple and is advantageous in cost while realizing a secure operation. Further, in comparison with the case of forming the window portion mentioned above in the vehicle body side which has a complex structure, it is possible to easily tune the collision absorption.

Further, since as the rotation promoting portion at a time of rotating the pivot bracket 3, the contact portion 10 is provided in the front end portion of the lock plate 7, whereby the contact portion 10 is brought into contact with the rear end portion 3B of the pivot bracket 3 when the pedal bracket is compressed and deformed between the fixed portion of the lock plate and the shaft 4 by the movement absorbing portion and the lock plate 7 comes near the pivot bracket 3, thereby promoting the rotational operation of the pivot bracket 3, it is possible to smoothly and securely rotate the pivot bracket 3.

Further, since the spring 11 corresponding to the urging member for urging the pedaling position of the pedal arm 6 toward the forward portion of the vehicle at a time of rotating the pivot bracket 3 is provided between the pivot bracket 3 and the pedal arm 6, it is possible to positively draw the pedaling position of the pedal arm 6 near the forward portion of the vehicle in an effective manner at a time of the front collision of the vehicle or the like.

Next, a description will be in detail given of a second embodiment of a brake pedal apparatus of a vehicle in accordance with the present invention with reference to FIGS. 4 to 7. A longitudinal direction and the like in the present embodiment are the same as those of the first embodiment.

In the present embodiment, a basic structure is the same as that of the first embodiment, however, a structure of the movement absorbing portion corresponding to the collision absorbing portion is different therefrom. As a movement absorbing portion of the present embodiment, a slide mechanism capable of sliding against a load input equal to or more than a predetermined value mentioned below is employed.

In the present embodiment, as shown in FIGS. 4 to 7, the pedal bracket 2 is basically constituted by the plate members 2A and 2A arranged apart from each other as a pair of opposing side surface portions, an upper plate member 2Z bonded to the rear portion thereof by welding or the like, and a mounting member 2C connecting the plate members 2A and 2A at a front portion, A long hole 2Y is formed on the upper plate member 2Z in a longitudinal direction as a window portion of a movement absorbing portion mentioned below.

Reference numeral 3' denotes a pivot bracket rotatably pivoted to the shaft 4 provided in the pedal bracket 2.

The pivot bracket 3' is formed in a substantially C shape having an open upper portion as seen from a rear portion, and a notch portion 3C' open to a front side so that the pedal arm 6 can be arranged is provided in a lower surface portion connecting opposing side plate portions 3'A and 3'A of the pivot bracket 3'.

Further, the pivot bracket 3' is formed in an L shape as seen from a side portion, and the pedal shaft 5 rotatably pivoting the pedal arm 6 is provided near the L-shaped bent portion mentioned above so as to be disposed in the lower front portion of the shaft corresponding to the center of rotation of the pivot bracket 3'.

Reference numeral 7' denotes a lock plate fixed to a lower surface portion of the dash upper panel 12B having a rear portion connected to an upper end of the dash lower panel 12A and extending backward in the vehicle, together with the upper surface plate member 2Z of the pedal bracket 2.

In particular, the lock plate 7' is provided with a flat-shaped fixed portion in a rear side thereof, and a bolt hole 7'A is formed in the fixed portion. Then, the lock plate 7' is fastened and fixed to a lower surface of the vehicle body side bracket 13 connected and arranged on the lower surface of the dash upper panel 12B via the hole 7'A together with the upper plate member 2Z of the pedal bracket 2 by the bolt 14 and the nut 15, At this time, the bolt 14 is mounted so as to pass through the rear side of the long hole 2Y of the upper plate member 2Z.

On the contrary, the front end portion of the lock plate 7' has an engagement portion 17 protruded to a side end portion thereof.

The engagement portion 17 is slidably mounted to an upper edge flange portion of the plate members 2A and 2A in the pedal bracket 2, and is engaged with the notch portion 18 provided in the front end portion of the side plate portion 3'A of the pivot bracket 3'.

Accordingly, in a normal state corresponding to a state that the vehicle is not collided, the engagement portion 17 in the front end portion of the lock plate 7' and the notch portion 18 in the front end portion of the pivot bracket 3' are engaged in the manner mentioned above, thereby securely restricting the downward rotation of the pivot bracket 3', rotating the pedal arm 6 around the pedal shaft 5 corresponding to a supporting point and securely performing a general Master vac operation via a push rod 9 connected to the pedal arm 6.

On the contrary, at a time of a front collision of the vehicle or the like, the pedal bracket 2 slides in a backward direction of the vehicle in the long hole 2Y corresponding to the window portion as the movement absorbing portion at a time when the pedal bracket 2 relatively moves backward. Due to a compression deformation in a longitudinal direction generated by this sliding operation, the lock plate 7' fixed to the dash upper panel 128 relatively moves with respect to the pivot bracket 3' in the forward diction while being guided by the upper edge flange portion of the pedal bracket 2.

Accordingly, an engagement between the pivot bracket 3' and the lock plate 7' is disconnected so as to allow the rotation of the pivot bracket 3', rotate the pivot bracket 3' in the backward and downward direction around the shaft 4 corresponding to a supporting point and draw a pedaling position of the pedal arm 6 near the forward side of the vehicle.

That is, also in the present embodiment, it is possible to obtain basically the same operation and effect as those of the first embodiment, that is, it is possible to move the pedal shaft 5 of the pedal arm 6 backward in the vehicle, and move the pedaling position of the pedal arm 6 to the forward portion of the vehicle.

In this case, in accordance with the present embodiment, the lock plate 7' is formed in a step shape so as to be one stage lower between the rear fixed portion and the front end portion, and a bead portion 7'B extending in a longitudinal direction is formed in a substantially center portion of the step portion, thereby increasing a deformation strength and a rigidity against an input operation in a longitudinal direction. Further, a downward flange 7'C is formed in the side edge of the flat-shaped fixed portion of the lock plate 7' by a bending formation, thereby increasing a strength and a rigidity thereof.

Further, in accordance with the present embodiment, as a rotation promoting portion for promoting a rotational operation of the pivot bracket 3', a spring 21 for urging the pivot bracket 3' downward when the pivot bracket 3' rotates is provided between the pivot bracket 3' and the pedal arm 6.

In particular, the spring 21 is wound around the shaft 4 and both end portions thereof are engaged with the side plate portion 3'A of the pivot bracket 3' and the upper portion of the pedal arm 6.

Further, a spring 22 is provided among the pedal bracket 2, the pedal shaft 5 and the pedal arm 6, as an urging member for promoting the rotational operation of the pivot bracket 3' by urging the pedal arm 6 toward the rear portion of the vehicle in the normal state and urging the pivot bracket 3' downward when the pivot bracket 3' rotates.

In particular, the spring 22 is wound around the pedal shaft 5, and both end portions thereof are engaged with portions at which the lower edge of the pedal bracket 2 and the front surface of the pedal arm 6 cross so as to open downward as seen from a side portion.

Figure 6:
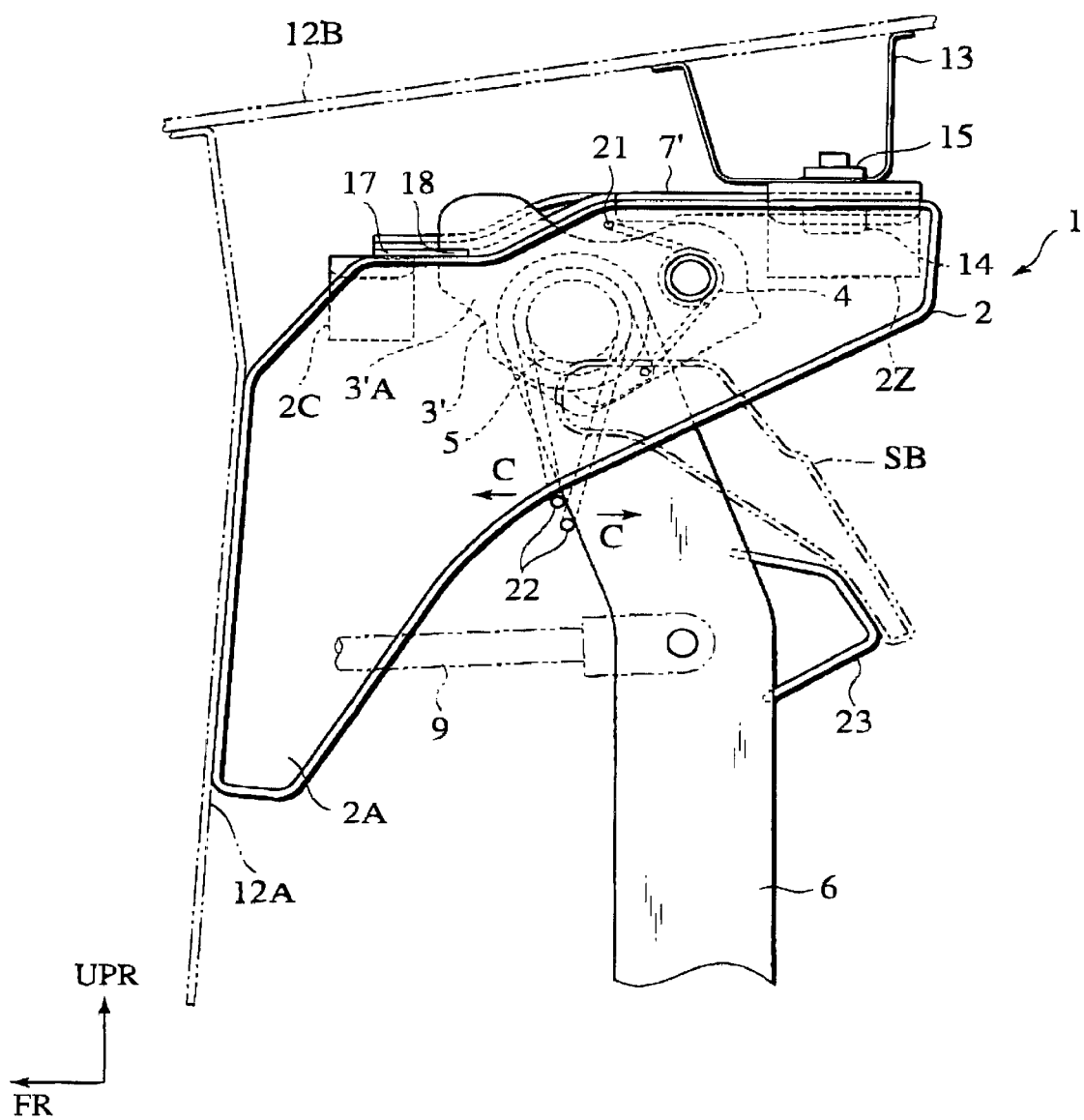
FIG. 6 is a side elevational view of the second embodiment in correspondence to a normal state.
Figure 7:
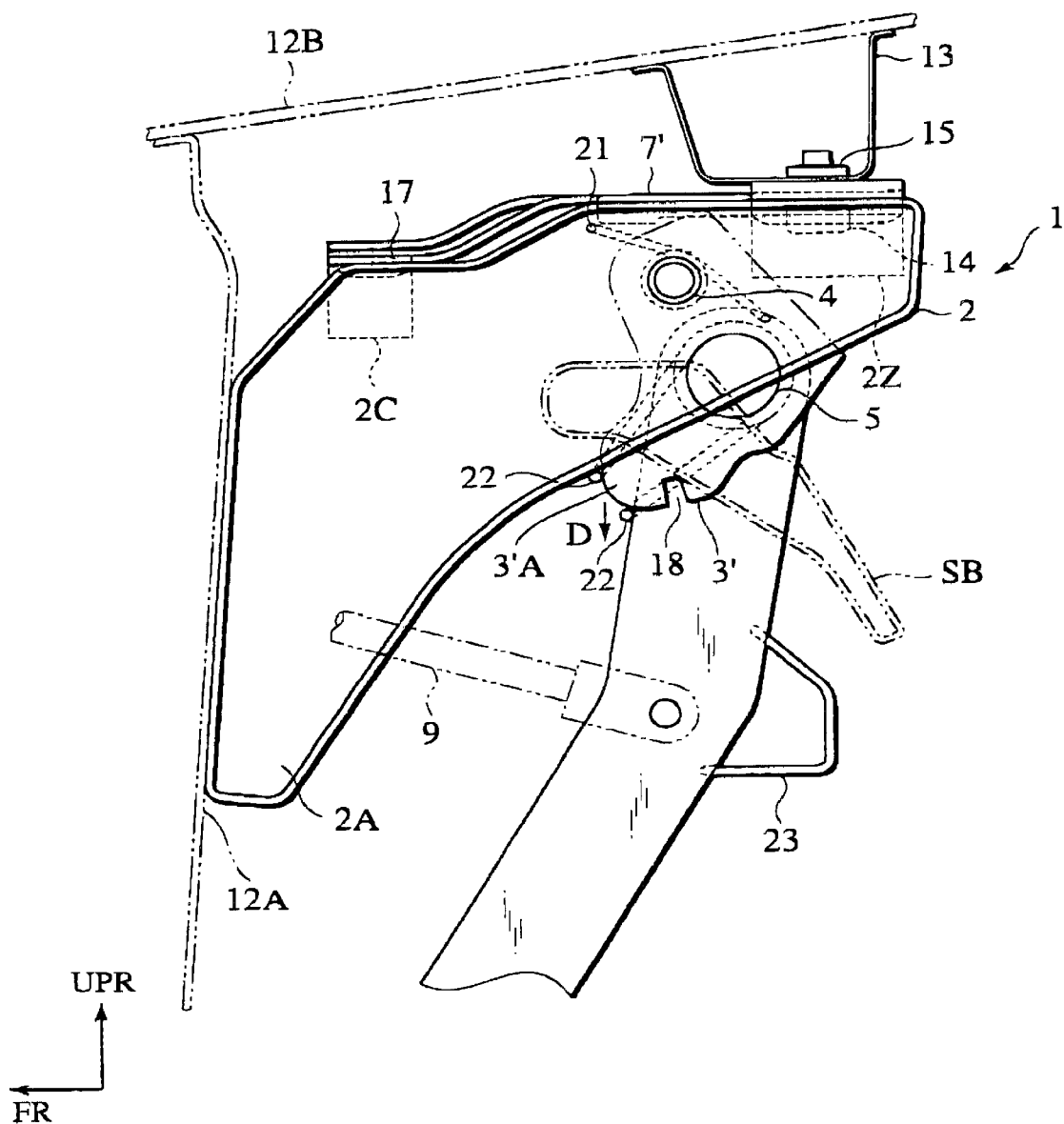
FIG. 7 is a side elevational view of the second embodiment in correspondence to a collision state.

That is, the spring 22 is applied only in a direction of expanding the pedal bracket 2 and the pedal arm 6 (in a direction of an arrow C) in the normal state shown in FIG. 6 so as to urge the pedal arm 6 toward an initial position at the rear portion of the vehicle, however, when the engagement between the pivot bracket 3' and the lock plate 7' is disconnected at a time of collision or the like, the spring 22 is applied in a direction of an arrow D shown in FIG. 7 so as to urge the pivot bracket 3' downward, thereby promoting the downward rotation of the pivot bracket 3'.

In FIGS. 6 and 7, reference numeral 23 denotes a stopper fixed to the pedal arm 6 and restricting the pedal arm 6 to the initial position, and reference symbol SB is a stopper bracket fixed to the pedal bracket 2 so as to receive the stopper 23.

As mentioned above, also in the structure in accordance with the present embodiment, even in the case that at a time of collision, the Master vac (not shown) moves backward or the dash lower panel 12A is deformed to the passenger's room, so that the push rod 9 of the Master vac (not shown) moves backward, it is possible to obtain the same effect as that of the first embodiment, that is, it is possible to effectively prevent the pedaling position from being shifted and the driver from generating a feeling of physical disorder.

Further, particularly in accordance with the present embodiment, as is different from the first embodiment, since the window portion corresponding to the movement absorbing portion is constituted by the long hole 2Y formed in the upper plate portion 2Z of the pedal bracket 2 and the slide mechanism capable of sliding the pedal bracket 2 backward can be realized by the long hole 2Y, in comparison with the case of crushing the window portion 8 as in the first embodiment, it is possible to stably absorb an impact and it is possible to further easily tune an impact absorption.

Further, since as the rotation promoting portion at a time of rotating the pivot bracket 3', the spring 21 for urging the pivot bracket 3, downward when the pivot bracket 3' rotates is provided between the pivot bracket 3' and the pedal arm 6 so as to be wound around the shaft 4, it is possible to smoothly and securely rotate the pivot bracket 3'.

Further, since the spring 21 corresponding to the urging member for urging the pedal arm 6 toward the backward direction of the vehicle in the normal state and urging the pivot bracket 3' downward so as to promote the rotational operation of the pivot bracket 3' at a Time of rotating the pivot bracket 3' is provided among the pedal bracket 2, the pedal shaft 5 and the pedal arm 6, it is possible to securely arrange the pedal arm 6 at the initial position in the normal state and it is possible to further promote the rotational operation of the pivot bracket 3' at a time when the vehicle collides or the like, Further, since the pedal shaft 5 provided in the pivot bracket 3' is set in the downward front portion in comparison with the shaft 4 corresponding to the center of rotation of the pivot bracket 3' and the load of the pivoted pedal arm 6 or the like is applied to the pedal shaft 5, the center of gravity of the pivot bracket 3' at the rotating time is below the shaft 4 corresponding to the center of rotation, whereby it is possible to further promote the rotational operation of the pivot bracket 3'.

In this case, in each of the embodiments mentioned above, the pedal bracket 1 is fixed to the lower surface portion of the dash upper panel 5, however, the structure is not limited to this, and the structure may be, of course, made such that the pedal bracket 1 is positioned in the upward rear portion of the dash lower panel, for example, the pedal bracket 1 can be fixed to the vehicle body member such as the steering member or the like extending in a widthwise direction of the vehicle.

The entire contents of a Patent Application No. TOKUGANHEI 11-189554 with a filing date of Jul. 2, 1999 in Japan and the entire contents of a Patent Application No. TOKUGANHEI 11-375844 with a filing date of Dec. 28, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A brake pedal apparatus of a vehicle comprising:
   a pedal bracket having a shaft and a first fixed portion to be fixed to a first vehicle body member at the front thereof;
   a pivot bracket rotatably pivoted to the shaft and provided with a pedal shaft apart from the shaft in a longitudinal direction of the vehicle;
   a pedal arm rotatably pivoted to the pedal shaft;
   a lock plate having an engagement portion allowing relative movement thereof with respect to at least the pivot bracket when a backward input over a predetermined load is applied to the pedal bracket and engaging with the pivot bracket in a normal state; and
   a rotation promoting member promoting a rotational operation of the pivot bracket,
   wherein when the backward input over the predetermined load is applied to the pedal bracket, whereby the lock plate relatively moves, an engagement between the pivot bracket and the lock plate is disconnected and the pivot bracket is downward rotated around the shaft.

2. A brake pedal apparatus of a vehicle according to claim 1, wherein the pedal bracket further has a second fixed portion to be fixed to a lower surface of a second vehicle body member positioned in the upward rear side of the first vehicle body member, at least the engagement portion of the lock plate is movably mounted to the pedal bracket, and a movement absorbing portion allowing a movement in a longitudinal direction between the shaft and the second fixed portion is provided at least between the shaft and the second fixed portion.

3. A brake pedal apparatus of a vehicle according to claim 2, wherein the movement absorbing portion is constituted by using a window portion.

4. A brake pedal apparatus of a vehicle according to claim 3, wherein the window portion is provided in the pedal bracket.

5. A brake pedal apparatus of a vehicle according to claim 4, wherein the pedal bracket is provided with a pair of opposing side surface portions, the second fixed portion is provided at the rear of the lock plate, the lock plate is fixed with a rear end portion of the pedal bracket, and the window portion is provided in the side surface portion of the pedal bracket in the front side from the fixed portion between the pedal bracket and the lock plate.

6. A brake pedal apparatus of a vehicle according to claim 4, wherein the second fixed portion has an upper surface portion at the rear of the pedal bracket, and the window portion is formed in the upper surface portion.

7. A brake pedal apparatus of a vehicle according to claim 6, wherein an overlap member overlapped with the upper surface portion is provided at the rear of the lock plate.

8. A brake pedal apparatus of a vehicle according to claim 7, wherein the rotation promoting member is provided in the lock plate and has a contact portion, and the contact portion is brought into contact with a rear end portion of the pivot bracket above the shaft when the pedal bracket moves between the first fixed portion and the shaft by the movement absorbing portion so that a distance between the first fixed portion and the shaft is reduced, thereby promoting the rotational operation of the pivot bracket.

9. A brake pedal apparatus of a vehicle according to claim 7, wherein the rotation promoting member is provided between the pivot bracket and the pedal bracket, and has an urging member capable of urging the pivot bracket downward when the pivot bracket rotates.

10. A brake pedal apparatus of a vehicle according to claim 1, further comprising an urging member provided between the pivot bracket and the pedal arm, and capable of urging a pedaling position of the pedal arm forward when the pivot bracket rotates.

11. A brake pedal apparatus of a vehicle according to claim 1, further comprising an urging member provided among the pedal shaft, the pedal bracket and the pedal arm, urging the pedal arm backward in the normal state, and capable of urging the pivot bracket downward when the pivot bracket rotates.

12. A brake pedal apparatus of a vehicle comprising:
   a pedal bracket having a shaft and a first fixed portion to be fixed to a first vehicle body member at the front thereof;
   a pivot bracket rotatably pivoted to the shaft and provided with a pedal shaft apart from the shaft in a longitudinal direction of the vehicle;

a pedal arm rotatably pivoted to the pedal shaft; and a lock plate having an engagement portion allowing relative movement thereof with respect to at least the pivot bracket when a backward input over a predetermined load is applied to the pedal bracket and engaging with the pivot bracket in a normal state, wherein when the backward input over the predetermined load is applied to the pedal bracket, whereby the lock plate relatively moves, an engagement between the pivot bracket and the lock plate is disconnected and the pivot bracket is downward rotated around the shaft, and wherein the pedal shaft provided in the pivot bracket is set in the downward front side in comparison with the shaft corresponding to a center of rotation of the pivot bracket.

* * * * *